United States Patent [19]
Plumb

[11] 3,933,280
[45] Jan. 20, 1976

[54] BULK CARGO UNLOADER AERATOR
[75] Inventor: Rex V. Plumb, Hopwood, Pa.
[73] Assignee: Fruehauf Corporation, Detroit, Mich.
[22] Filed: Apr. 11, 1974
[21] Appl. No.: 459,887

[52] U.S. Cl. .............................. 222/193; 222/195
[51] Int. Cl.² .......................................... B67D 5/54
[58] Field of Search .......... 222/193, 195, 200, 202, 222/203; 302/29, 53; 259/DIG. 17

[56] References Cited
UNITED STATES PATENTS
| | | | |
|---|---|---|---|
| 978,667 | 12/1910 | Sicka | 259/DIG. 17 |
| 3,269,428 | 8/1966 | Stockel et al. | 222/195 |
| 3,645,583 | 2/1972 | Heath | 222/195 X |

FOREIGN PATENTS OR APPLICATIONS
1,153,745   5/1969   United Kingdom ................ 222/200

Primary Examiner—Robert B. Reeves
Assistant Examiner—Larry H. Martin
Attorney, Agent, or Firm—Harness, Dickey & Pierce

[57] ABSTRACT

Apparatus for aerating and assisting the discharge of pulverulent or finely divided dry cargo such as bulk Portland cement comprises a discharge hopper with a sloping bottom having a port in its sloping wall and a cylindrical aerating assembly insertable and removable through the port and consisting of an apertured tube into which air is fed under pressure and which is covered by a fabric sleeve.

1 Claim, 4 Drawing Figures

BULK CARGO UNLOADER AERATOR

BACKGROUND OF THE INVENTION

As is well known, where subdivided dry materials are to be discharged through a tapered bottom hopper, plugging sometimes occurs due to the tendency of the product to arch therein, or due to caking from other causes. It has heretofore been common to insert various devices for discharging air or other gas into the material in the hopper to inhibit plugging. Generally it has been considered advisable to direct the air upwardly and away from the walls, although some systems have also directed air downwardly within the hopper. Such systems have ordinarily required a substantial amount of permanently-installed piping. The use of a fabric member through which the air is discharged has been found advantageous. Due to the abrasive effect of the dry materials, it is necessary to replace the fabric member periodically. The present invention has an object to provide an improved and simplified air-operated device for the purpose indicated which can be quickly and easily removed and reinstalled, so as to facilitate servicing. It has been found that effective operation of the device disclosed herein is obtained with air discharge throughout 360° around a horizontal unit which extends substantially across the hopper, between the side walls. The invention is therefore installable without regard to angular orientation. This aspect simplifies both construction and installation, and is related to a further object of the invention. Further objects also include the provision of such a device which is inexpensive, rugged, reliable, compact, and which requires a minimum of piping or conduit means.

Other objects and advantages will become apparent upon consideration of the present disclosure in its entirety.

BRIEF DESCRIPTION OF THE FIGURES OF DRAWING

DETAILED DESCRIPTION OF THE PREFERRED FORM OF THE INVENTION

Figure 1:
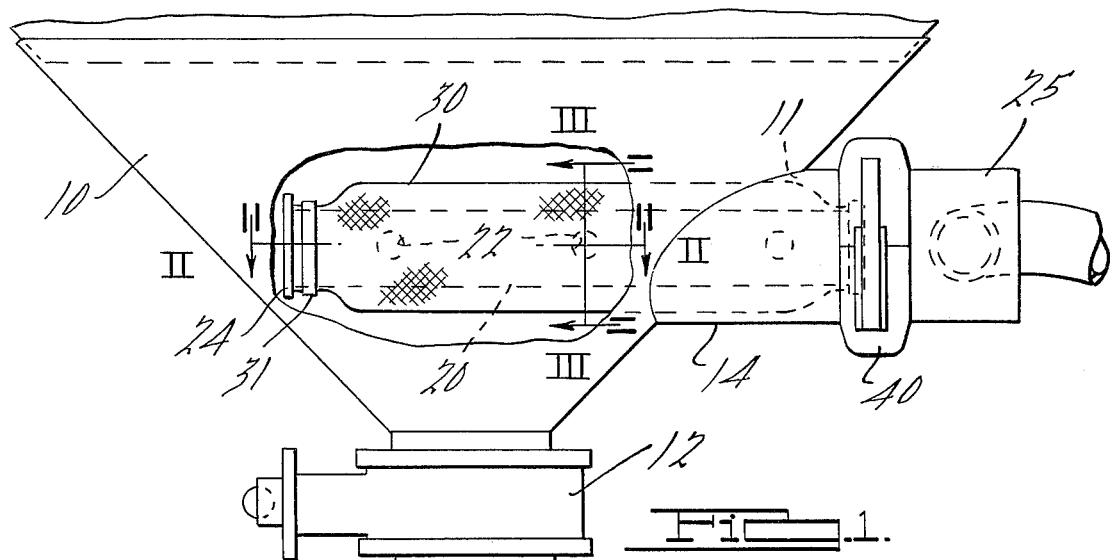
FIG. 1 is a side elevational view, partly broken away, of a hopper and unloader aerator installation constructed in accordance with the present invention.
Figure 3:
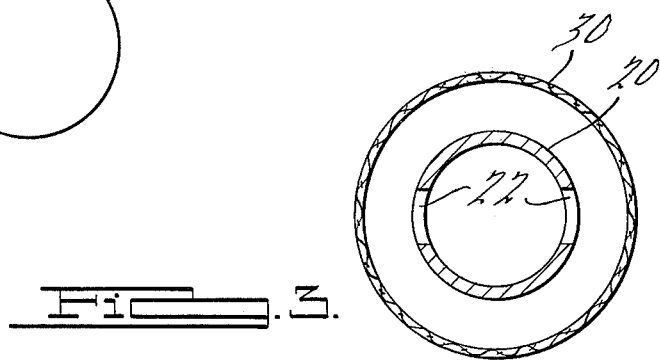
FIG. 3 is a cross section on the line III—III of FIG. 1.
Figure 2:
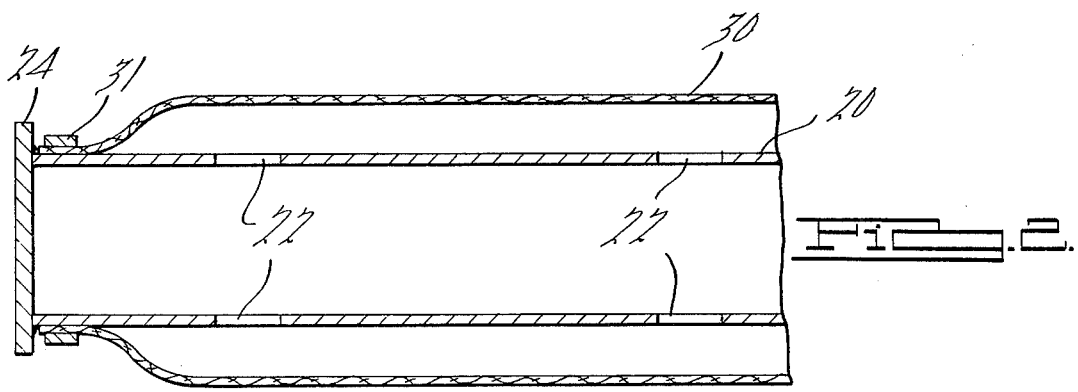
FIG. 2 is a longitudinal section of a portion of the aerator, taken substantially on the line II—II of FIG. 1 and looking in the direction of the arrows.
Figure 4:
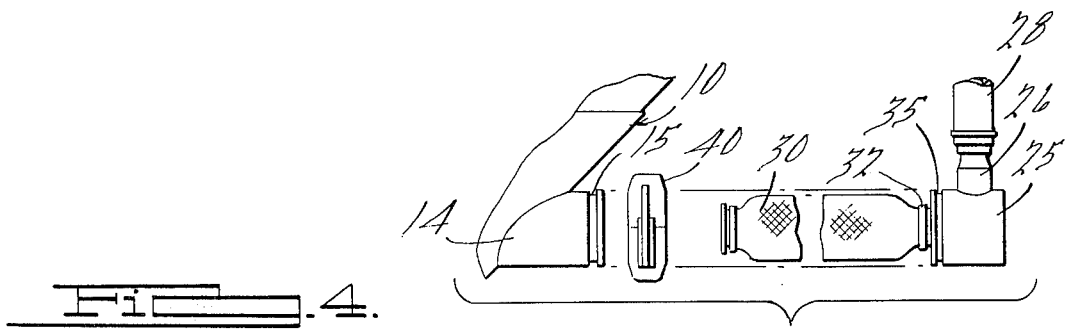
FIG. 4 is a fragmentary side elevational view showing the aerator assembly removed from the hopper.

Reference character 10 designates generally a hopper, the discharge from which may be controllable by a suitable discharge valve 12. In order to permit the ready installation and removal of the aerating assembly the hopper 10 is provided with an orifice 11 surrounded by a laterally-projecting neck 14, located in a mid-portion of a side wall thereof. The neck is of relatively large diameter, and is provided with a coupling groove 15 near its outer end.

The aerating assembly consists of a rigid tube 20 having a series of holes 22 in its side wall, closed at its outer end by a plate 24 and at its other end, which comprises its inlet, secured to and interiorly communicating with a metal inlet fitting 25. Fitting 25 has a neck 26 to which an air supply hose 28 is securable, as shown.

A porous fabric sleeve 30 is secured over the orificed portion of the tube 20 as by clamping rings 31, 32 at its ends, so that the air fed therethrough is finely subdivided and distributed through the material in the hopper. Movement of the fabric sleeve due to pulsations in the air supply and the impact of material on the sleeve also assist in maintaining free flow through the hopper.

It will be noted that a portion of the fabric sleeve 30 lies inside the neck 14 and that the sleeve is somewhat smaller than the neck, so that the air discharge inhibits clogging in the neck, as well as in the cross section of the hopper.

The portion of the fitting 25 which abuts the end of the neck 14 when the assembly is installed is of the same diameter as the neck, as is provided with a similar coupling groove 35 so that the assembly can be secured in its operative position shown in FIG. 1 by means of a quickly releasable clamp 40. The tube 20 and entire aerating assembly are thus supported entirely at the neck. When the clamp is released, the assembly can be pulled out for any necessary servicing or replacement.

This Detailed Description of Preferred Form of the Invention, and the accompanying drawings, have been furnished in compliance with the statutory requirement to set forth the best mode contemplated by the inventor of carrying out the invention. The prior portions consisting of the "Abstract of the disclosure" and the "Background of the Invention" are furnished without prejudice to comply with administrative requirements of the Patent Office.

What is claimed is:

1. In combination with a hopper having a side wall with an orifice-defining portion in said wall between the top and bottom thereof, an aerating assembly comprising a rigid pervious elongated tubular supporting member and a loose porous fabric enclosing sleeve secured thereover, a hollow neck carried by said orificed portion of the wall and projecting laterally outwardly from the hopper, the aerating assembly having a cross sectional area which is materially less than that of the interior of the neck and also materially less than that of the orifice defined by said portion and being insertable into the hopper, and removable from the hopper, through said neck and orifice, coupling clamp means appurtenant to said neck which when released frees said aerating assembly for removal from said neck, said assembly being in a generally horizontal position and extending into and through said neck and orifice and across the hopper, with an air inlet portion of said assembly connectible through said neck and coupling to an external air supply, a portion of said sleeve being inside the neck when the aerating assembly is secured in said position, whereby air may be discharged into the neck as well as into a cross section of the hopper to prevent clogging in either area, and whereby air is also directed laterally into the hopper from the neck.

* * * * *